United States Patent
Ooizumi et al.

(10) Patent No.: US 8,554,036 B2
(45) Date of Patent: Oct. 8, 2013

(54) GRADED INDEX MULTIMODE OPTICAL FIBER

(75) Inventors: Haruo Ooizumi, Hyogo (JP); Syuichi Kusunoki, Hyogo (JP); Takaharu Kinoshita, Hyogo (JP); Masayoshi Hachiwaka, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 55 days.

(21) Appl. No.: 12/920,359

(22) PCT Filed: Mar. 13, 2009

(86) PCT No.: PCT/JP2009/001141
§ 371 (c)(1),
(2), (4) Date: Aug. 31, 2010

(87) PCT Pub. No.: WO2009/128200
PCT Pub. Date: Oct. 22, 2009

(65) Prior Publication Data
US 2011/0002590 A1  Jan. 6, 2011

(30) Foreign Application Priority Data
Apr. 16, 2008 (JP) ................ 2008-106744

(51) Int. Cl.
*G02B 6/028* (2006.01)
(52) U.S. Cl.
USPC ............................ 385/124; 385/24
(58) Field of Classification Search
USPC .................... 385/124, 24
See application file for complete search history.

(56) References Cited

U.S. PATENT DOCUMENTS

| | | | | |
|---|---|---|---|---|
| 4,641,917 A | * | 2/1987 | Glodis et al. | 385/127 |
| 4,691,990 A | * | 9/1987 | Cohen et al. | 385/127 |
| 4,715,679 A | * | 12/1987 | Bhagavatula | 385/127 |
| 4,715,695 A | * | 12/1987 | Nishimura et al. | 385/127 |
| 4,852,968 A | * | 8/1989 | Reed | 385/127 |
| 5,361,319 A | * | 11/1994 | Antos et al. | 385/123 |
| 5,781,673 A | * | 7/1998 | Reed et al. | 385/24 |

(Continued)

FOREIGN PATENT DOCUMENTS

| | | |
|---|---|---|
| JP | 59-232302 | 12/1984 |
| JP | 2006-047719 | 2/2006 |
| JP | 2006047719 A * | 2/2006 |

OTHER PUBLICATIONS

International Search Report for corresponding International Application No. PCT/JP2009/001141 mailed May 12, 2009.

(Continued)

*Primary Examiner* — Charlie Peng
*Assistant Examiner* — Peter Radkowski
(74) *Attorney, Agent, or Firm* — Renner, Otto, Boisselle & Sklar, LLP

(57) ABSTRACT

A graded index multimode optical fiber (10) includes: a core (11) having an outside diameter of 45-65 μm; a first cladding (12) surrounding the core (11); a second cladding (13) surrounding the first cladding (12) and made of a material having a lower refractive index than the first cladding (12); and a third cladding (14) surrounding the second cladding (13) and made of a material having a higher refractive index than the second cladding (13). The ratio of the outside diameter of the first cladding (12) to the outside diameter of the core (11) is 1.15-1.25.

3 Claims, 3 Drawing Sheets

(56) References Cited

U.S. PATENT DOCUMENTS

| | | | | |
|---|---|---|---|---|
| 5,883,990 | A * | 3/1999 | Sasaoka et al. | 385/37 |
| 6,535,679 | B2 * | 3/2003 | Yokoyama et al. | 385/127 |
| 6,594,429 | B1 * | 7/2003 | White | 385/124 |
| 6,947,650 | B1 * | 9/2005 | Homa | 385/123 |
| 7,254,305 | B2 * | 8/2007 | Mishra | 385/127 |
| 7,295,741 | B2 * | 11/2007 | Sako et al. | 385/127 |
| 7,421,174 | B2 * | 9/2008 | Fleming et al. | 385/124 |
| 7,680,381 | B1 * | 3/2010 | Bookbinder et al. | 385/127 |
| 7,773,846 | B2 * | 8/2010 | Bickham et al. | 385/125 |
| 2001/0043782 | A1 * | 11/2001 | Yokoyama et al. | 385/127 |
| 2003/0113084 | A1 * | 6/2003 | Knudsen et al. | 385/127 |
| 2004/0252961 | A1 * | 12/2004 | Peuchert et al. | 385/141 |
| 2006/0034575 | A1 * | 2/2006 | Sako et al. | 385/127 |
| 2007/0053642 | A1 * | 3/2007 | Mishra | 385/127 |
| 2008/0050075 | A1 * | 2/2008 | Fleming et al. | 385/123 |
| 2009/0052851 | A1 * | 2/2009 | Donlagic | 385/124 |
| 2009/0060436 | A1 * | 3/2009 | Bickham et al. | 385/124 |

OTHER PUBLICATIONS

Form PCT/ISA/237 for International Application No. PCT/JP2009/001141 dated May 12, 2009.

Takatoshi Kato et al., "Depression Shifted Fiber for WDM Transmission", Technical Report of IEICE, OCS96-58, OPE96-106, LQE96-109, Nov. 1996 and partial English translation.

Nunome et al., Institute of Electronics, Information, and Communication Engineers; "Chromatic Dispersion Characteristics of Trench Type Optical Fiber", Mar. 20, 2007, p. 350, with partial English translation.

Nunome et al., Institute of Electronics, Information, and Communication Engineers; "Splice Characteristics of Trench-Assisted Bend-Insensitive Fiber", Sep. 10, 2007, p. 207, with partial English translation.

* cited by examiner

GRADED INDEX MULTIMODE OPTICAL FIBER

TECHNICAL FIELD

The present invention relates to graded index multimode optical fibers.

BACKGROUND ART

Multimode optical fibers through each of which a plurality of modes propagate include step index (SI) fibers and graded index (GI) fibers. SI multimode optical fibers each include a core made of, e.g., pure quartz, and each have a uniform refractive index profile. By contrast, GI multimode optical fibers each include a core made of, e.g., quartz doped with germanium (Ge), and each have a refractive index profile called a graded profile along the diameter of the core. While SI multimode optical fibers have the problem of mode dispersion in which the propagation delay time increases with increasing mode order, GI multimode optical fibers are designed to have a graded profile in order to provide uniform propagation delay times of modes, thereby reducing the mode dispersion to a low level. Such graded profiles generally include a square distribution profile.

PATENT DOCUMENT 1 describes an optical transmission fiber including a GI core having a square refractive index distribution profile, a first cladding surrounding the core and having a thickness of $1/100$-$1/20$ of the core diameter, a second cladding surrounding the first cladding and having a lower refractive index than the first cladding, and a third cladding surrounding the second cladding and having a lower refractive index than the second cladding.

PATENT DOCUMENT 2 describes a GI multimode optical fiber including a core having an $\alpha$-th power refractive index profile and a cladding surrounding the core, and configured so that an outer peripheral portion of the cladding forms a depressed region. Such a depressed region has a lower refractive index than an inner peripheral portion of the cladding, and has a multiple-step-like refractive index profile in which the refractive index increases toward the outer periphery of the cladding. PATENT DOCUMENT 2 further describes that such a configuration can provide excellent bending loss characteristics of a GI multimode optical fiber.

CITATION LIST

Patent Document

PATENT DOCUMENT 1: Japanese Patent Publication No. S59-232302
PATENT DOCUMENT 2: Japanese Patent Publication No. 2006-47719

SUMMARY OF THE INVENTION

A graded index multimode optical fiber of the present invention includes: a core having an outside diameter of 45-65 µm; a first cladding surrounding the core; a second cladding surrounding the first cladding and made of a material having a lower refractive index than the first cladding; and a third cladding surrounding the second cladding and made of a material having a higher refractive index than the second cladding. The ratio of an outside diameter of the first cladding to the outside diameter of the core is 1.15-1.25.

In the graded index multimode optical fiber of the present invention, the second cladding may have a thickness of 7.5-15 µm.

In the graded index multimode optical fiber of the present invention, the relative refractive index difference of the second cladding with respect to the first cladding may be 0.5-1.5%.

DESCRIPTION OF EMBODIMENTS

An embodiment of the present invention will be described hereinafter in detail with reference to the drawings. The present invention is not limited to the following embodiment. A GI multimode optical fiber 10 is used for, e.g., communications cables and wiring in devices.

Figure 1:
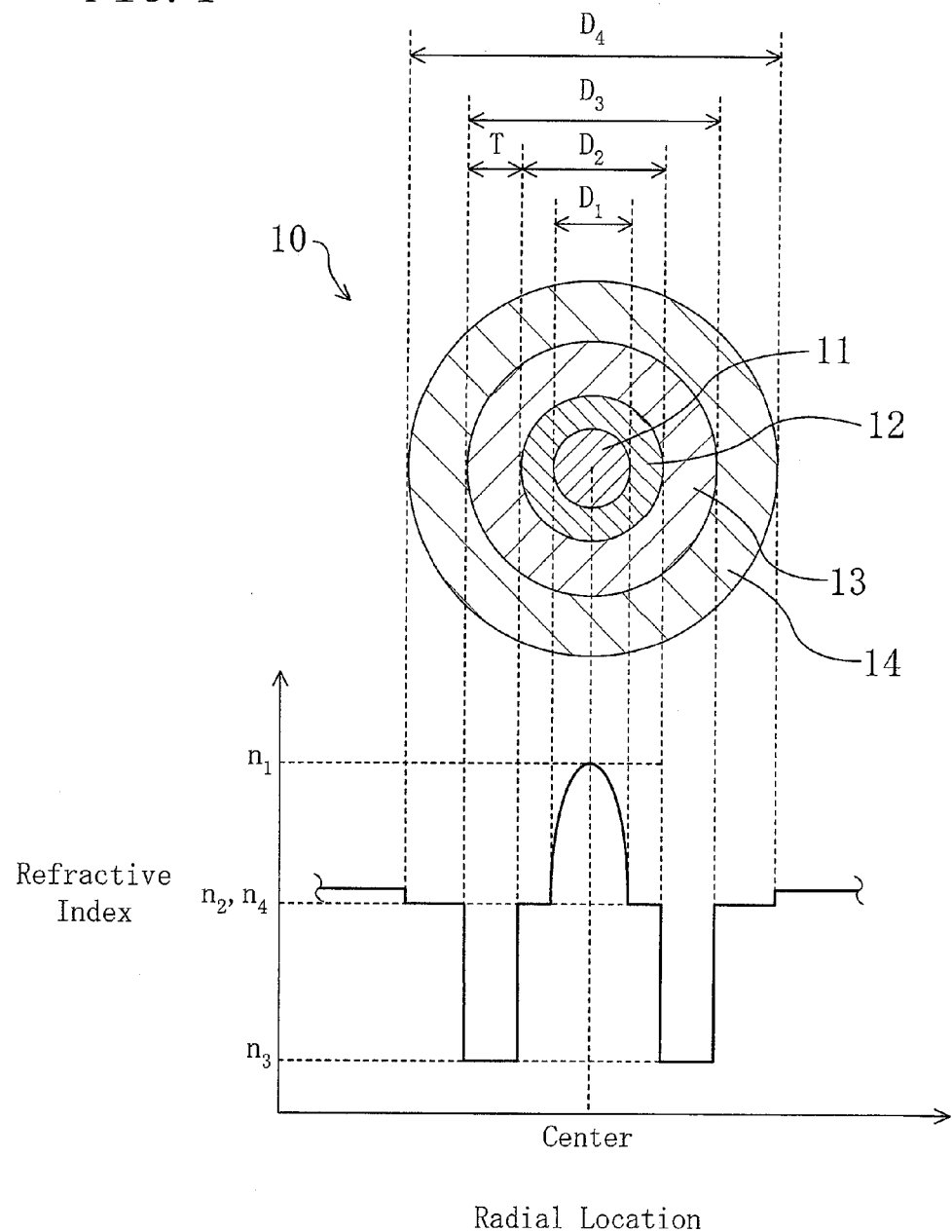
FIG. 1 is a schematic view schematically illustrating a cross-sectional view of a GI multimode optical fiber according to this embodiment, and the refractive index profile corresponding to the cross-sectional view together.

FIG. 1 illustrates a cross-sectional view of the GI multimode optical fiber 10 according to this embodiment, and the refractive index profile corresponding to the cross-sectional view together.

The GI multimode optical fiber 10 includes a core 11 at the center of the fiber, a first cladding 12 surrounding the core 11, a second cladding 13 surrounding the first cladding 12, a third cladding 14 surrounding the second cladding 13, and a coating layer (not shown) surrounding the third cladding 14. The GI multimode optical fiber 10 has a diameter of, e.g., 125 µm.

The core 11 is made of, e.g., quartz doped with germanium, etc.

The refractive index profile of the core 11 corresponds to a GI profile in which the refractive index increases toward the center of the core 11 while decreasing toward the outer periphery thereof. The refractive index profile corresponds to a square refractive index distribution profile designed to uniform propagation delay times of modes. Such a refractive index profile is formed by increasing the doping concentration of germanium toward the center of the core 11 and decreasing the dose of germanium toward the outer periphery thereof. The relative refractive index difference $\Delta_1$ of the highest refractive index $n_1$ (i.e., the refractive index of the core center) with respect to the lowest refractive index $n_2$ (i.e., the refractive index of the outer periphery of the core 11) is, for example, 1.0%. The relative refractive index difference $\Delta_1$ of $n_1$ with respect to $n_2$ is represented by $$\Delta_1 = (n_2 - n_1)/n_2 \times 100 [\%]$$

The core 11 has an outside diameter $D_1$ of, e.g., 45-65 µm. The core diameter $D_1$ is preferably equal to, e.g., the outside diameter of the core of a multimode optical fiber defined as SGI-50/125 in the JIS C6832 standard (i.e., 50 µm), or the core diameter of an optical fiber conforming to the international electrotechnical commission (IEC) standard (i.e., 62.5

μm) in terms of consistency with already-existing optical fibers or any other optical elements.

The first cladding 12 is made of, e.g., pure quartz. The refractive index $n_2$ of the first cladding 12 is, for example, 1.456.

The outside diameter $D_2$ of the first cladding 12 is, for example, 50-80 μm. The ratio $D_2/D_1$ of the first cladding diameter $D_2$ to the core diameter $D_1$ is 1.15-1.25 and preferably 1.17-1.23.

The second cladding 13 is made of, e.g., quartz doped with fluorine, boron, etc.

The thickness T of the second cladding 13 is preferably greater than or equal to 7.5 μm and more preferably greater than or equal to 10 μm in order to reduce the bending loss. By contrast, the thickness T of the second cladding 13 is preferably less than or equal to 15 μm in terms of the design of the diameter of the entire GI multimode optical fiber 10. Specifically, the thickness T of the second cladding 13 is preferably 7.5-15 μm and more preferably 10-15 μm.

The refractive index $n_3$ of the second cladding 13 is lower than the refractive index $n_2$ of the first cladding 12. The refractive index $n_3$ of the second cladding 13 is, for example, 1.434-1.449. The relative refractive index difference $\Delta_2$ of the second cladding 13 with respect to the first cladding 12 is preferably 0.5-1.5% and more preferably 0.7-1.4% in order to reduce the bending loss without increasing the transmission loss. Here, the relative refractive index difference $\Delta_2$ of the second cladding 13 with respect to the first cladding 12 is represented by $$\Delta_2=(n_2-n_3)/n_2\times100[\%]$$

The third cladding 14 is made of, for example, pure quartz. The refractive index $n_4$ of the third cladding 14 is, for example, 1.456. The outside diameter $D_4$ of the third cladding 14 is, for example, 110-140 μm. The outside diameter $D_4$ of the third cladding 14 is preferably equal to, e.g., the outside diameter of the cladding of a multimode optical fiber defined as SGI-50/125 in the JIS C6832 standard (i.e., 125 μm) in terms of consistency with already-existing optical fibers or any other optical elements.

The coating layer is made of, e.g., polyamide resin, UV curable resin, or silicone resin. The coating layer has a thickness of, e.g., 60-400 μm.

The GI multimode optical fiber 10 can be fabricated by the following conventional method: a preform having a refractive index profile proportional to the refractive index profile of the optical fiber is produced by, e.g., chemical vapor deposition (CVD), outside vapor phase deposition (OVD), vapor-phase axial deposition (VAD), or a rod-in-tube technique; the surface of the optical fiber obtained by heating and drawing the preform is protected by the coating layer; and a screening test is performed on the protected optical fiber in order to increase the mechanical strength of the optical fiber.

In recent years, high-speed internet service called fiber to the home (FTTH) has been widely utilized in which optical fibers are routed into homes. Since FTTH systems require indoor wiring, a need exists for optical fibers which can accommodate small bend diameters.

Methods for reducing the allowable bend diameter of an optical fiber include a method in which the core refractive index is increased. However, this method causes the problem of a reduction in transmission band characteristics and the problem of an increase in transmission loss. The method further causes the problem of an increase in splice loss with a GI optical fiber for general purpose use.

However, when light is launched into the GI multimode optical fiber 10, lower-order mode light is transmitted through the optical fiber 10 while being totally reflected near the center of the core 11, and higher-order mode light is transmitted through the optical fiber 10 while being totally reflected near the outer surface of the core 11. The ratio $D_2/D_1$ of the first cladding diameter $D_2$ to the core diameter $D_1$ of the GI multimode optical fiber 10 is 1.15-1.25, and thus, even when the optical fiber 10 is bent to a radius of curvature of approximately 5 mm or approximately 10 mm by external forces, light can be transmitted with a reduction in the bending loss.

[Test Evaluation]

GI multimode optical fibers configured as described above were fabricated as first and second examples described below. Table 1 also illustrates the configurations and results of the fibers.

FIRST EXAMPLE

As a first example, a GI multimode optical fiber described in the embodiment was fabricated. In the GI multimode optical fiber, the core diameter $D_1$ was 47.5 μm, the ratio $D_2/D_1$ of the first cladding diameter $D_2$ to the core diameter $D_1$ was 1.21, the second cladding thickness T was 7.65 μm, the third cladding diameter $D_4$ was 125 μm, and the coating layer thickness was 62.5 μm. The refractive indices $n_1$, $n_2$, $n_3$, and $n_4$ were 1.472, 1.456, 1.442, and 1.456, respectively, and the relative refractive index difference $\Delta_2$ of the second cladding with respect to the first cladding was 0.95%.

The optical fiber was wrapped ten turns around a mandrel having a radius of 5 mm. Tests for light intensity were preformed before and after the wrapping of the optical fiber in conformity with the cutback method in the JIS C6823 standard. When the bending loss was determined based on the test results, the bending loss was 0 dB.

SECOND EXAMPLE

As a second example, a GI multimode optical fiber described in the embodiment was fabricated. In the GI multimode optical fiber, the core diameter $D_1$ was 49.3 μm, the ratio $D_2/D_1$ of the first cladding diameter $D_2$ to the core diameter $D_1$ was 1.16, the second cladding thickness T was 10.1 μm, the third cladding diameter $D_4$ was 125 μm, and the coating layer thickness was 62.5 μm. The refractive indices $n_1$, $n_2$, $n_3$, and $n_4$ were 1.472, 1.456, 1.435, and 1.456, respectively, and the relative refractive index difference $\Delta_2$ of the second cladding with respect to the first cladding was 1.42%.

When the bending loss of the second example was determined similarly to that of the first example, the bending loss of the second example was 0.03 dB.

TABLE 1

|  |  | First Example | Second Example |
| --- | --- | --- | --- |
| Core Diameter | $D_1$ (μm) | 47.5 | 49.3 |
| First Cladding Diameter | $D_2$ (μm) | 57.6 | 57 |
| First Cladding Diameter/Core Diameter | $D_2/D_1$ | 1.21 | 1.16 |
| Second Cladding Thickness | T (μm) | 7.65 | 10.1 |
| Third Cladding Diameter | $D_4$ (μm) | 125 | 125 |
| Core Refractive Index | $n_1$ | 1.472 | 1.472 |
| First Cladding Refractive Index | $n_2$ | 1.456 | 1.456 |
| Second Cladding Refractive Index | $n_3$ | 1.442 | 1.435 |
| Third Cladding Refractive Index | $n_4$ | 1.456 | 1.456 |
| Second Cladding Relative Refractive Index Difference | $\Delta_2$ | 0.95 | 1.42 |
| Bending Loss | (dB) | 0 | 0.03 |

The results of the first and second examples show that when the ratio $D_2/D_1$ of the first cladding diameter $D_2$ to the core diameter $D_1$ is 1.15-1.25, the second cladding thickness T is 7.5-15 µm, and the relative refractive index difference $\Delta_2$ of the first cladding with respect to the second cladding is 0.5-1.5%, neither of the band characteristics and splice characteristics of a GI multimode optical fiber having a small allowable bend diameter is reduced.

Next, first through third evaluation tests described below were performed on GI multimode optical fibers.

<First Evaluation Test>

First through fifth test fibers described below were fabricated, and the first evaluation test was performed in order to examine the relationships between the ratio $D_2/D_1$ of the first cladding diameter $D_2$ to the core diameter $D_1$ and the bending loss and between the above ratio and the splice loss.

—First Test Fiber—

As a first test fiber, a GI multimode optical fiber described in the embodiment was fabricated. In the GI multimode optical fiber, the core diameter $D_1$ was 50 µm, the ratio $D_2/D_1$ of the first cladding diameter $D_2$ to the core diameter $D_1$ was 1.02, the second cladding thickness T was 4.5 µm, the third cladding diameter $D_4$ was 125 µm, and the coating layer thickness was 62.5 µm. The refractive indices $n_1$, $n_2$, $n_3$, and $n_4$ were 1.472, 1.456, 1.450, and 1.456, respectively, and the relative refractive index difference $\Delta_2$ of the second cladding with respect to the first cladding was 0.4%.

The bending loss of the optical fiber was determined similarly to that of the first example. Furthermore, the splice loss was determined based on the light intensities before and after splicing, which were measured in conformity with the cutback method in the JIS C6823 standard by using a fusion splicer. The bending loss and splice loss of the first test fiber were 0.25 dB and 0.40 dB, respectively.

—Second Test Fiber—

As a second test fiber, a GI multimode optical fiber was fabricated with the same configuration as the first test fiber except that the ratio $D_2/D_1$ of the first cladding diameter $D_2$ to the core diameter $D_1$ was 1.38.

The bending loss and splice loss of the second test fiber were 0.20 dB and 0.12 dB, respectively.

—Third Test Fiber—

As a third test fiber, a GI multimode optical fiber was fabricated with the same configuration as the first test fiber except that the ratio $D_2/D_1$ of the first cladding diameter $D_2$ to the core diameter $D_1$ was 1.2.

The bending loss and splice loss of the third test fiber were 0.18 dB and 0.09 dB, respectively.

—Fourth Test Fiber—

As a fourth test fiber, a GI multimode optical fiber was fabricated with the same configuration as the first test fiber except that the ratio $D_2/D_1$ of the first cladding diameter $D_2$ to the core diameter $D_1$ was 1.14.

The bending loss and splice loss of the fourth test fiber were 0.20 dB and 0.10 dB, respectively.

—Fifth Test Fiber—

As a fifth test fiber, a GI multimode optical fiber was fabricated with the same configuration as the first test fiber except that the ratio $D_2/D_1$ of the first cladding diameter $D_2$ to the core diameter $D_1$ was 2.5.

The bending loss and splice loss of the fifth test fiber were 0.472 dB and 0.08 dB, respectively.

<Second Evaluation Test>

Sixth through eleventh test fibers described below were fabricated, and the second evaluation test was performed in order to examine the relationship between the second cladding thickness T and the bending loss.

—Sixth Test Fiber—

As a sixth test fiber, a GI multimode optical fiber described in the embodiment was fabricated. In the GI multimode optical fiber, the core diameter $D_1$ was 50 µm, the ratio $D_2/D_1$ of the first cladding diameter $D_2$ to the core diameter $D_1$ was 1.38, the second cladding thickness T was 8 µm, the third cladding diameter $D_4$ was 125 µm, and the coating layer thickness was 62.5 µm. The refractive indices $n_1$, $n_2$, $n_3$, and $n_4$ were 1.470, 1.456, 1.449, and 1.456, respectively, and the relative refractive index difference $\Delta_2$ of the second cladding with respect to the first cladding was 0.50%.

When the bending loss of the optical fiber was determined similarly to that of the first example, the bending loss was 0.20 dB.

—Seventh Test Fiber—

As a seventh test fiber, a GI multimode optical fiber was fabricated with the same configuration as the sixth test fiber except that the second cladding thickness T was 3 µm.

The bending loss of the seventh test fiber was 0.32 dB.

—Eighth Test Fiber—

As an eighth test fiber, a GI multimode optical fiber was fabricated with the same configuration as the sixth test fiber except that the second cladding thickness T was 1 µm.

The bending loss of the eighth test fiber was 0.472 dB.

—Ninth Test Fiber—

As a ninth test fiber, a GI multimode optical fiber was fabricated with the same configuration as the sixth test fiber except that the second cladding thickness T was 10 µm.

The bending loss of the ninth test fiber was 0.32 dB.

—Tenth Test Fiber—

As a tenth test fiber, a GI multimode optical fiber was fabricated with the same configuration as the sixth test fiber except that the second cladding thickness T was 13 µm.

The bending loss of the tenth test fiber was 0.09 dB.

—Eleventh Test Fiber—

As an eleventh test fiber, a GI multimode optical fiber was fabricated with the same configuration as the sixth test fiber except that the second cladding thickness T was 15 µm.

The bending loss of the eleventh test fiber was 0.05 dB.

<Third Evaluation Test>

Twelfth through nineteenth test fibers described below were fabricated, and the third evaluation test was performed in order to examine the relationships between the relative refractive index difference $\Delta_2$ of the second cladding with respect to the first cladding and the bending loss and between the above relative refractive index difference and the transmission loss.

—Twelfth Test Fiber—

As a twelfth test fiber, a GI multimode optical fiber described in the embodiment was fabricated. In the GI multimode optical fiber, the core diameter $D_1$ was 50 the ratio $D_2/D_1$ of the first cladding diameter $D_2$ to the core diameter $D_1$ was 1.24, the second cladding thickness T was 6 the third cladding diameter $D_4$ was 125 µm, and the coating layer thickness was 62.5 µm. The refractive indices $n_1$, $n_2$, $n_3$, and $n_4$ were 1.472, 1.456, 1.450, and 1.456, respectively, and the relative refractive index difference $\Delta_2$ of the second cladding with respect to the first cladding was 0.4%.

The bending loss of the optical fiber was determined similarly to that of the first example. Furthermore, the transmission loss was determined in conformity with the OTDR method in the JIS C6823 standard. The bending loss and transmission loss of the twelfth test fiber were 0.25 dB and 2.20 dB, respectively.

—Thirteenth Test Fiber—

As a thirteenth test fiber, a GI multimode optical fiber was fabricated with the same configuration as the twelfth test fiber except that the refractive index $n_3$ of the second cladding was 1.452 and the relative refractive index difference $\Delta_2$ of the second cladding with respect to the first cladding was 0.3.

The bending loss and transmission loss of the thirteenth test fiber were 0.31 dB and 2.31 dB, respectively.

—Fourteenth Test Fiber—

As a fourteenth test fiber, a GI multimode optical fiber was fabricated with the same configuration as the twelfth test fiber except that the refractive index $n_3$ of the second cladding was 1.455 and the relative refractive index difference $\Delta_2$ of the second cladding with respect to the first cladding was 0.1.

The bending loss and transmission loss of the fourteenth test fiber were 0.30 dB and 2.16 dB, respectively.

—Fifteenth Test Fiber—

As a fifteenth test fiber, a GI multimode optical fiber was fabricated with the same configuration as the twelfth test fiber except that the refractive index $n_3$ of the second cladding was 1.452 and the relative refractive index difference $\Delta_2$ of the second cladding with respect to the first cladding was 0.25.

The bending loss and transmission loss of the fourteenth test fiber were 0.30 dB and 2.22 dB, respectively.

—Sixteenth Test Fiber—

As a sixteenth test fiber, a GI multimode optical fiber was fabricated with the same configuration as the twelfth test fiber except that the refractive index $n_3$ of the second cladding was 1.451 and the relative refractive index difference $\Delta_2$ of the second cladding with respect to the first cladding was 0.35.

The bending loss and transmission loss of the sixteenth test fiber were 0.30 dB and 2.20 dB, respectively.

—Seventeenth Test Fiber—

As a seventeenth test fiber, a GI multimode optical fiber was fabricated with the same configuration as the twelfth test fiber except that the refractive index $n_3$ of the second cladding was 1.435 and the relative refractive index difference $\Delta_2$ of the second cladding with respect to the first cladding was 1.45.

The bending loss and transmission loss of the seventeenth test fiber were 0.03 dB and 2.94 dB, respectively.

—Eighteenth Test Fiber—

As an eighteenth test fiber, a GI multimode optical fiber was fabricated with the same configuration as the twelfth test fiber except that the refractive index $n_3$ of the second cladding was 1.442 and the relative refractive index difference $\Delta_2$ of the second cladding with respect to the first cladding was 0.95.

The bending loss and transmission loss of the eighteenth test fiber were 0 dB and 2.21 dB, respectively.

—Nineteenth Test Fiber—

As a nineteenth test fiber, a GI multimode optical fiber was fabricated with the same configuration as the twelfth test fiber except that the refractive index $n_3$ of the second cladding was 1.449 and the relative refractive index difference $\Delta_2$ of the second cladding with respect to the first cladding was 0.5.

The bending loss and transmission loss of the nineteenth test fiber were 0.10 dB and 2.20 dB, respectively.

<Evaluation Test Results and Consideration>

Figure 2:
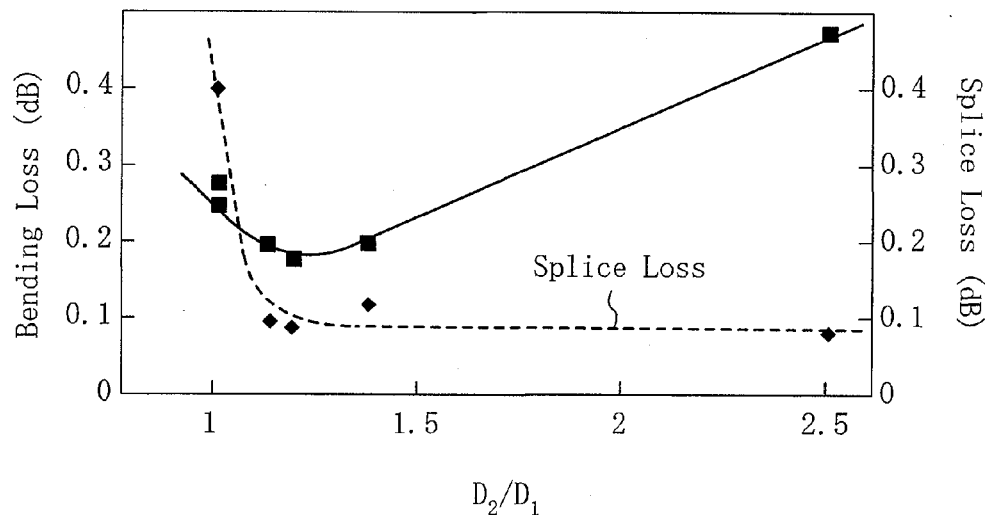
FIG. 2 is a graph illustrating the relationships between the ratio of the first cladding diameter to the core diameter and the bending loss and between the above ratio and the splice loss.

FIG. 2 shows that when the ratio $D_2/D_1$ of the first cladding diameter $D_2$ to the core diameter $D_1$ is 1.15-1.25, the bending loss of the optical fiber can be reduced without reducing the splice loss thereof.

Figure 3:
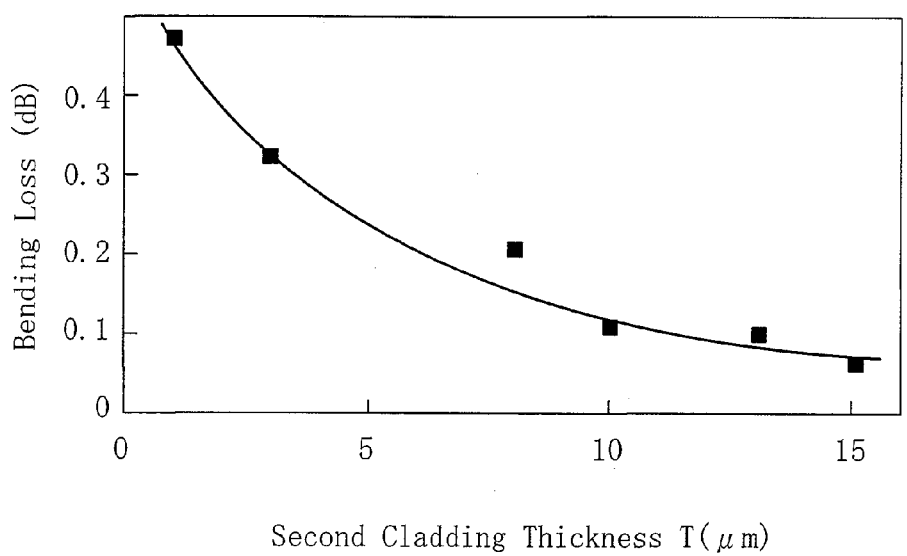
FIG. 3 is a graph illustrating the relationship between the second cladding thickness and the bending loss.

FIG. 3 shows that when the second cladding thickness T is greater than or equal to 7.5 μm, the bending loss can be reduced.

Figure 4:
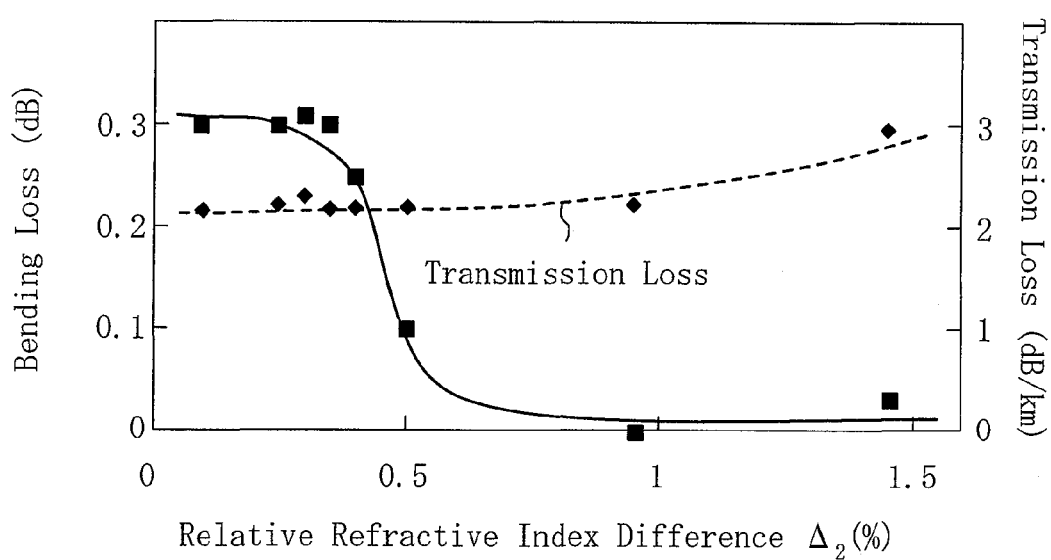
FIG. 4 is a graph illustrating the relationships between the relative refractive index difference of the second cladding with respect to the first cladding and the bending loss and between the above relative refractive index difference and the transmission loss.

FIG. 4 shows that when the relative refractive index difference $\Delta_2$ of the second cladding with respect to the first cladding is 0.5-1.5, the bending loss of the optical fiber can be reduced without reducing the transmission characteristics thereof.

INDUSTRIAL APPLICABILITY

As described above, the present invention is useful for GI multimode optical fibers each having a small allowable bend diameter.

The invention claimed is:

1. A graded index multimode optical fiber comprising:
a core having an outside diameter of 45-65 μm;
a first cladding surrounding the core;
a second cladding surrounding the first cladding and made of a material having a lower refractive index than the first cladding; and
a third cladding surrounding the second cladding and made of a material having a higher refractive index than the second cladding,
wherein a ratio of an outside diameter of the first cladding to the outside diameter of the core is 1.15-1.25, and
wherein the second cladding has a thickness of 7.5-15 μm.

2. A graded index multimode optical fiber comprising:
a core having an outside diameter of 45-65 μm;
a first cladding surrounding the core;
a second cladding surrounding the first cladding and made of a material having a lower refractive index than the first cladding; and
a third cladding surrounding the second cladding and made of a material having a higher refractive index than the second cladding,
wherein a ratio of an outside diameter of the first cladding to the outside diameter of the core is 1.15-1.25, and
wherein the relative refractive index difference of the second cladding with respect to the first cladding is 0.5-1.5%.

3. The graded index multimode optical fiber of claim 1, wherein
the relative refractive index difference of the second cladding with respect to the first cladding is 0.5-1.5%.

* * * * *